FRANK T. CHRISTIAN
FREDERICK A. SEELIG
CHARLES B. GIBBONS
INVENTORS

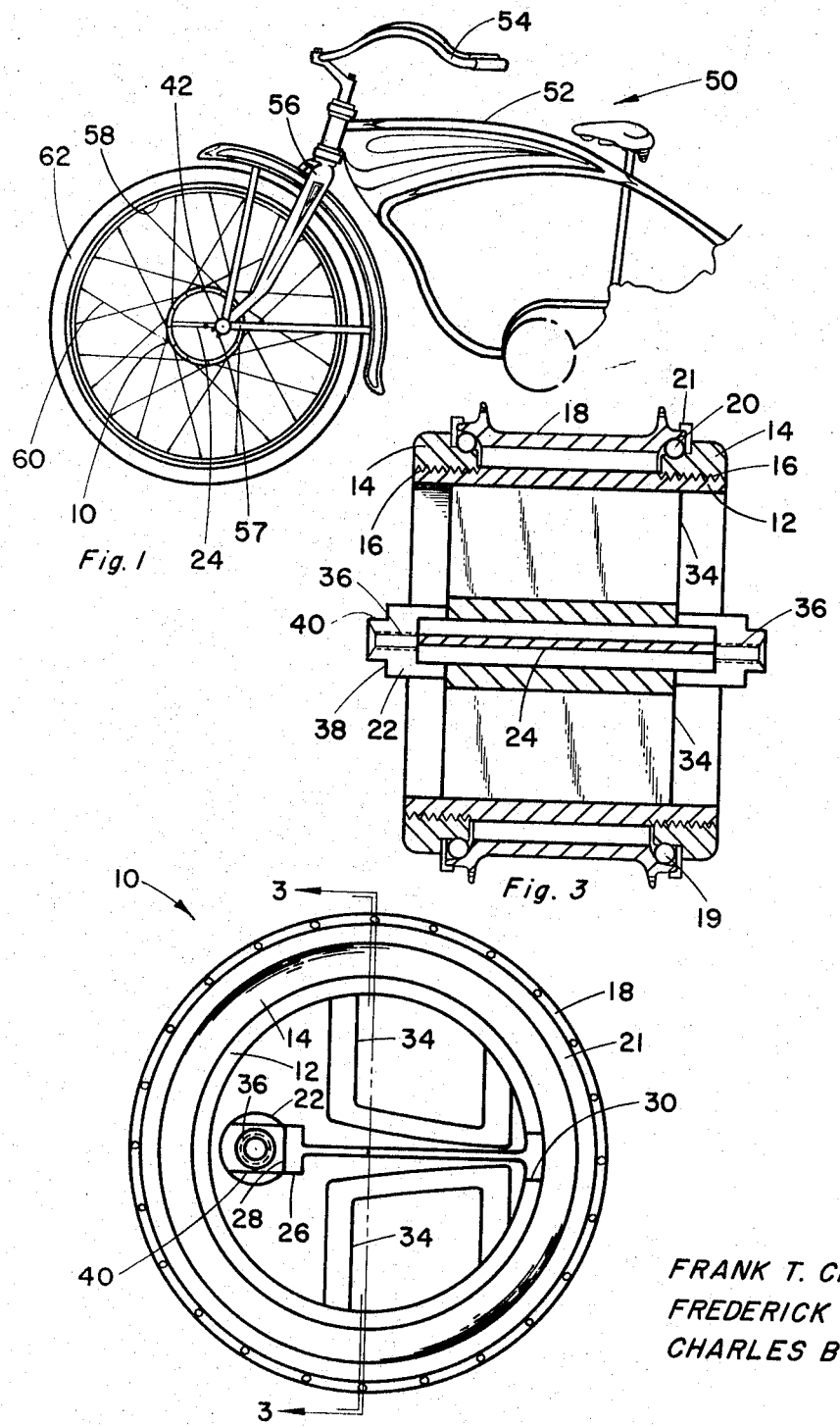

3,307,856
WHEEL SUSPENSION DEVICE

Frank T. Christian, Elmira, Frederick A. Seelig, New Hartford, and Charles B. Gibbons, Utica, N.Y., assignors to The Bendix Corporation, Elmira, N.Y., a corporation of Delaware
Filed Feb. 4, 1965, Ser. No. 430,396
9 Claims. (Cl. 280—286)

The present invention relates to a novel suspension system for wheeled devices. More particularly, the present invention relates to a suspension system for loaded devices, especially devices subject to impact loads in which the suspension system comprises flat flexure-type spring members or leaf spring type members interconnecting a loaded shaft to an inner hub about which an outer hub or wheel is free to rotate.

An object of the present invention is to provide a compact self-contained wheel hub assembly for stationary and moving systems which has shock-absorbing properties and is non-oscillatory.

Another object is to provide a simple, compact wheel suspension system contained within a wheel-hub assembly in which the inner hub axis does not tend to rotate about its own transverse ends.

Another object is to provide a self-contained wheel suspension system and wheel hub assembly which may be readily integrated into existing wheel systems.

Another object of this invention is to provide wheel suspension which has excellent shock-absorbing characteristics with a minimum of axle displacement.

Another object of this invention is to provide a novel wheel suspension system which absorbs shock by transforming radial and tangential impacts into rotational motion.

Another object of this invention is to provide a lightweight, compact shock-absorbing wheel suspension system which is readily adaptable to a wide variety of applications on wheeled vehicles such as velocipedes, carts, motorcycles, wagons, sulkies and the like. It is anticipated that the present invention will be most successfully employed on relatively lightly-loaded wheeled vehicles.

A further object of the present invention is to provide a shock-absorbing suspension system for bicycles and the like which, unlike present devices, has no exposed operating parts which are a hazard to users.

A still further object of the present invention is to provide a shock-absorbing wheel hub assembly unit which permits an outer wheel to rotate freely.

A still further object of the present invention is to have a stop device to limit the radial deflection of the wheel suspension system. The stop device itself may be composed of a resilient energy-absorbing material to increase the energy absorption capabilities of the suspension system.

A still further object of the invention is the creation of a non-oscillatory wheel suspension system of the flexure spring type which is self-damping.

Other objects and advantages of the present invention can be readily appreciated from the following description and figures.

FIGURE 1 illustrates an embodiment of the invention employed in a bicycle.

FIGURE 2 illustrates one embodiment of the invention.

FIGURE 3 illustrates a sectional view of the embodiment shown in FIGURE 2 along the line 3—3.

Figure 4:
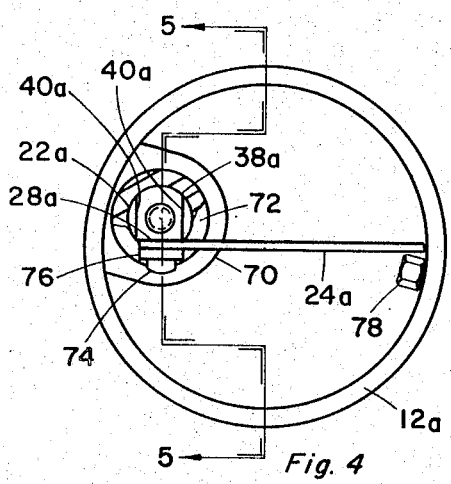
FIGURE 4 illustrates another embodiment of the inner hub assembly of the invention being a part of the invention.

Referring to FIGURES 1 through 3, the novel suspension system is indicated generally by the numeral 10. An inner hub or inner annulus 12 has bearing cones 14 threaded thereon at 16. An outer hub or outer annulus 18 having a bearing race 19 is mounted concentrically about the inner hub or inner annulus 12 on ball bearings 20 which are adjacent dust cap 21.

An axle or shaft 22 is eccentrically placed within the inner hub 12. A flat flexure or leaf-type spring 24 has a first cross-member 26 welded to it at one end. The cross-member is welded to a flattened surface 28 of the axle or shaft 22. The spring 24 is welded at its other end into a slot 30 formed in the inner hub or inner annulus 12. Those skilled in the art can appreciate that other methods can be used for fastening the spring to the axle and inner hub; for example, both the shaft 22 and the inner hub 12 could be slotted and the spring 24 could be welded at both ends into the slots or the spring 24 could be mounted by rivets or screws to the axle 22 and the inner hub 12.

Abutments or stops 34 are connected to the inner hub or inner annulus 12. The innermost surface of the abutments 34 is shaped to mate with the contour of the spring 24 when the inner annulus 12 is at the maximum angular displacement permitted by the abutment. Depending on the use to which the suspension system is to be put, the abutment or stop 34 may be inflexible or resilient. If a resilient stop is used, the suspension system will have additional energy-absorbing properties. The abutments 34 may be variously shaped to permit a greater or less angular displacement of the inner annulus 12 relative to the shaft or axle 22. The stops 34 could be so connected to the inner annulus; for example, by an adjustment screw (not shown), so that its placement within the inner annulus could be variable. As shown in FIGURE 3, one embodiment of this invention employs a flexure or leaf-type spring 24, generally rectangular in shape, having an axial size nearly equal the axial length of the inner hub 12. A wide spring insures the axial rigidity of the assembly. The axial size of the flexure may be varied. Further, the stops also prevent the shaft from rotating about its transverse ends. Those skilled in the art will appreciate that a single abutment or stop could be used.

The axle or shaft 22 is internally threaded 36 at its transverse ends 38. The transverse ends 38 of the shaft 22 have flat sides 40 formed thereon. Bolts 42, in FIGURE 1, are threaded into the shaft or axle 22 to mount the body to be suspended.

Figure 5:
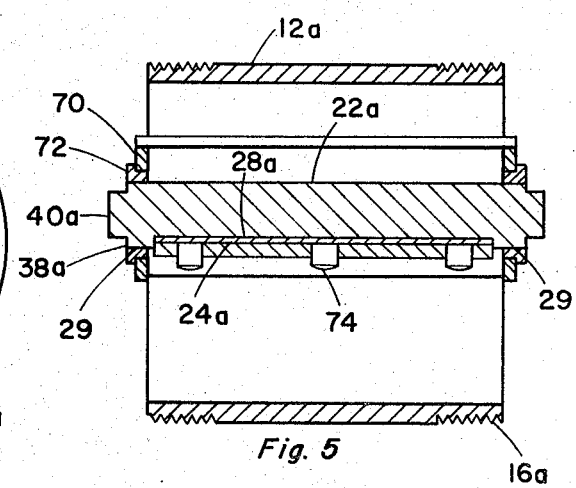
FIGURE 5 illustrates a sectional view of the portion of the embodiment shown in FIGURE 4 along the line 5—5.

The embodiment shown in FIGURES 4 and 5 is generally similar to that shown in FIGURES 2 and 3 and similar parts are designated by similar numbers suffixed by the letter "a." In the embodiment illustrated in FIGURES 4 and 5, it is to be understood that the bearing cones 14, bearing cap 21, bearings 20, bearing races 19 are all to be attached in the manner shown in FIGURES 2 and 3.

The embodiment shown in FIGURES 4 and 5 is capable of operating successfully with larger loads which tend to move the axle, 22a, axis away from its parallel line with the inner hub axis 12a. To prevent such an occurrence, mounting members 70 of generally-arcuate shape are welded or otherwise firmly fastened to the transerse ends of the inner hub 12a. A bushing or bearing device 72 is placed within the mounting member 70. The axle or shaft 22a, which has a bearing surface 29 on its traverse ends, is then fitted into the bushing or bearing 72. The axle, 22a, axis is thereby prevented from rotating with respect to the inner hub 12a axis. The flat spring member, 24a, is fastened to the flattened end, 28a, of the axle or shaft 22a, by a bolt 74 and washer 76. The other end of the spring or flexure, 24a, extends radially to the inner hub, 12a, where it is connected to the inner hub, 12a, in a loaded direction by a lug member 8. Another lug member or other fastening device can be readily added on the other side of the spring 24a if desired.

Abutment or stop members 34, as shown in FIGURES 2 and 3, can be added to the embodiment shown in FIGURES 4 and 5 to limit the displacement of the axle relative to the inner hub and to absorb impact energy. The stop could be added on either or both sides of the spring or flexure 24a as desired either because the axle will be deflected in both directions or to provide a reversible assembly.

Figure 6:
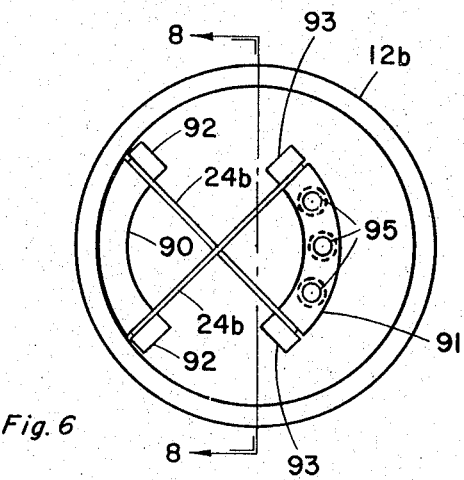
FIGURE 6 illustrates another embodiment of the inner hub assembly being a portion of the invention.
Figure 8:
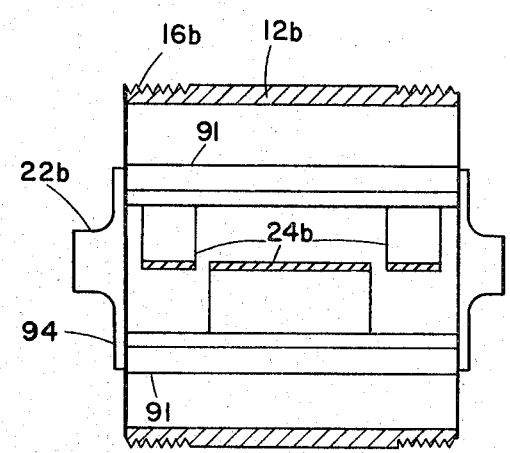
FIGURE 8 illustrates a composite sectional view of the portion of the embodiment shown in FIGURES 6 and 7 taken along the line 8—8.
Figure 7:
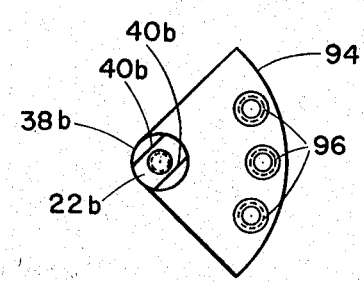
FIGURE 7 illustrates the mounting device for mounting the axle to the inner hub assembly shown in FIGURE 6.

The embodiment shown in FIGURES 6, 7 and 8 is generally similar to that shown in FIGURES 2 and 3 and similar parts are designated by similar numbers suffixed by the letter "b." In the embodiment of the invention shown in FIGURES 6, 7 and 8, it is to be understood that the bearing cones 14, bearing caps 21, bearings 20 and bearing races 19 are all to be attached in the manner shown in FIGURE 2 and 3.

In the embodiment shown in FIGURES 6 and 8, a number of flat spring members, 24b, are employed. Three such springs are shown in FIGURE 8, but any other number could be used.

A first arcuate mounting plate or mounting member 90 is welded or otherwise connected to the inner circumference of the inner hub member 12b. Three flat spring or flexure members 24b are welded or otherwise fastened to mounting member 90. The spring members 24b are longitudinally spaced along the axis of the arcuate mounting member and are crossed as shown in FIGURES 6 and 8. A second arcuate mounting member or connecting member 91 is welded or otherwise fastened to the other ends of the spring or flexure members 24b. The second arcuate connecting member is internally threaded at 95. Arcuate axle mounting shield or connecting members 94 are bolted at 96 to the second arcuate connecting member 91. In the embodiment shown in FIGURES 6, 7 and 8, the inner hub 12b is concentric with the axle 22b. However, the inner hub 12b could be eccentric relative to the axle 22b.

FIGURE 1 illustrates a use of an embodiment of the present invention. The front of a bicycle, shown generally by the numeral 50 having a frame 52, handlebar 54 and front forks 56 slotted at the end 57, is connected to the axle or shaft 22 by means of the flat sides 40 (FIGURE 3) and a bolt 42 threaded into the axle 22. The flat sides 40 are shown oriented differently in FIGURE 1 than in FIGURES 2 and 3 because of the position of the forks. The outer hub 18 is connected to a rim 58 by spokes 60. A tire 62 is attached to the rim 58. The flexure or leaf spring 24 is mounted on the front of shaft 22, as shown in FIGURE 1, and extends along the maximum radius of the eccentric hub assembly to the inner hub 12.

In operation, when impact or varying or static loads are placed upon the axle or shaft 22 through the body suspended; for example, the bicycle shown in FIGURE 1, the inner hub or inner annulus 12 is angularly displaced with respect to the axle 22 by the flexure or spring 24. The axle or shaft is displaced very slightly, the energy of the impact or other load being absorbed by the flexure or leaf spring 24 in angularly displacing the inner hub or inner annulus 12. The outer hub or outer annulus 18 is free to rotate at all times about the inner hub 12. Thus, loading of the axle or shaft will not affect the rotation of the outer hub. The shaft is also displaced slightly in the direction from which the load came. The complex motion of the shaft or axle permits the creation of such a compact and effective wheel suspension device. A large amount of load energy may be absorbed in such motion.

If greater rigidity is needed for the same degree of flexibility of axle with respect to inner hub, the embodiments shown in FIGURES 4 and 5 and FIGURES 6, 7 and 8 are to be preferred. Each embodiment can be attached to the bicycle shown in FIGURE 1 by its respective flat sides, 40a and 40b, of its own axle 22a and 22b. These latter two embodiments of the invention hold the axle axis substantially parallel at all times to the inner hub axis in a more positive manner than the embodiment depicted in FIGURES 2 and 3. Such axial rigidity prevents wheel wobble. In the embodiment shown in FIGURES 4 and 5, axial rigidity is obtained through the use of the mounting member 70 which is journalled about the axle and fastened to the inner hub. In the embodiment shown in FIGURES 6, 7 and 8, axial rigidity is assured by crossing the flexures as shown in FIGURE 8.

It is frequently desirable in wheel suspension systems that displacement of the inner hub relative to the axle be limited. Such limitation of motion is achieved by the abutments or stops 34, as shown in FIGURES 2 and 3; the stop contacts the flexure as the inner hub is displaced relative to the axle. Similar stops could be added to the embodiment shown in FIGURES 4 and 5. In the embodiment shown in FIGURES 6, 7 and 8, abutments or stops 92 and 93 may be either fastened to or formed as part of their respective arcuate members 90 and 91.

The abutments or stops may be made from resilient materials which will give each embodiment additional shock and energy absorption capabilities. The abutments shown in FIGURES 2 and 3 have their external surfaces shaped to match the surface of the spring or flexure 24 at its maximum allowable displacement to provide a smooth arresting of motion of the inner hub 12, thereby preventing damage to the spring. In addition, a relatively-large contact area between spring and stop helps to prevent oscillation of the wheel suspension system when it is driven to maximum displacement.

The bicycle, shown in FIGURE 1, depicts the flexure leading the axle or shaft. The flexure or spring could as easily be used trailing the axle or at some other orientation within the hub no matter what embodiment of the present invention is employed. The orientation change can be made simply by altering the position of the flat sides, 40, 40a and 40b, as the case may be with respect to the appropriate axle, 22, 22a or 22b.

The present invention is compact, self-contained and effective. It can be used in a wide variety of applications for wheeled vehicles. It is especially appropriate for use in bicycles, go-carts, sulkies, motorcycles and the like. The response characterstics of the wheel suspension system may be altered by changing the type of spring as well as the spring width, thickness and length. The axle or shaft may be either eccentrically or concentrically disposed within the inner hub depending on the needs of the user.

As presently designed, the device is a non-oscillatory shock-absorbing wheel suspension system which transforms a large amount of loaded energy into rotation. Such a device provides good cushioning characteristics and prevents large displacements of the loaded axle.

We claim:
1. In a suspension system for a wheel comprising:
   an inner hub means;
   an outer hub means journalled thereon;
   an axle disposed within said inner hub means;
   a first flat spring means connected on one end to said inner hub means;

a second flat spring means connected on one end to said inner hub means and spaced longitudinally from said first spring means and crossed with said first spring means; and
connecting means for connecting said axle to said crossed first and second spring means.

2. In a suspension system for a wheel comprising:
an inner hub means;
an outer hub means journalled thereon;
an axle disposed within said inner hub means;
a plurality of first flat spring means connected on one end to said inner hub means;
a second flat spring means spaced axially on said inner hub means and connected thereto, said second flat spring means crossed with said plurality of first flat spring means; and
arcuate connecting means for connecting said axle to said first and second spring means.

3. The device described in claim 2 including further:
said arcuate connecting means having integral therewith an abutment means for limiting the displacement of said axle relative to said inner hub means.

4. In a suspension system for a wheel comprising:
an axle;
an inner hub means disposed concentrically about said axle;
bearing cones threaded to said inner hub means;
an outer hub having bearing races;
bearing means supporting said outer hub means about said inner hub means whereby said hubs may rotate independently of one another;
a first flat spring member;
a second flat spring member;
a first arcuate connecting means for connecting said first and second spring members in a longitudinally-crossed relationship, said first connecting means interconnecting one end of said first and second spring members to said inner hub means;
a second arcuate connecting means for connecting the other ends of said first and second spring members to said axle so that said axle may be displaced relative to said inner hub means;
said first and second spring members keeping the axis of said axle substantially parallel to the axis of said inner hub means;
means for mounting the object to be suspended; and
said first arcuate connecting means and said second arcuate connecting means capable of limiting the displacement of said axle relative to said inner hub means.

5. In a suspension system for a wheel comprising:
an axle having bearing surfaces on its transverse ends;
an inner hub means eccentrically disposed about said axle;
bearing cones threadedly received on said inner hub means;
an outer hub;
first bearing means rotatably supporting said outer hub about said inner hub means;
a plurality of arcuate mounting members connected to said inner hub means having bearing surfaces;
second bearing means supporting said mounting members about said axle; and
a leaf spring member of generally-rectangular shape interconnecting said axle and said inner hub means, said spring member extending generally radially outwardly from said axle along the maximum distance from said axle to inner hub means, said spring member permitting said inner hub means to displace angularly relative to said axle.

6. In a front wheel hub assembly for a velocipede comprising:
an inner hub means;
an outer hub means journalled thereon;
an axle disposed within said inner hub means;
a first flat spring means connected on one end to said inner hub means;
a second flat spring means connected on one end to said inner hub means and spaced longitudinally from said first spring means and crossed with said first spring means;
connecting means for connecting said axle to said crossed first and second spring means; and
means for mounting the front wheel assembly to the object to be suspended.

7. In a suspension system for a wheel comprising:
a non-rotatable axle;
an inner hub means disposed about said axle;
an outer hub means journalled to said inner hub means so that each of said hubs may rotate independently of the other;
spring means of generally-rectangular shape interconnecting said axle and said inner hub means;
said spring means extending radially outwardly from said axle toward said inner hub means;
said spring means rigid in the direction parallel to the axis of said axle, preventing relative axial movement of said axle within said inner hub means;
said spring means flexible in the plane perpendicular to said axle axis responsive to load conditions on the wheel; and
stop means for limiting the displacement of said axle relative to said inner hub means.

8. In a suspension system for a wheel comprising:
a non-rotatable axle having first connecting means formed on the outer transverse ends thereof;
support means having second connecting means formed thereon for engaging said first connecting means;
a cylindrical inner hub eccentrically disposed about said axle;
annular bearing cone members threadedly received on the outer transverse end of the outer circumference of said inner hub;
a cylindrical outer hub having a bearing race;
a plurality of bearings rotatably supporting said outer hub about said inner hub;
a leaf spring member of generally-rectangular shape interconnecting said axle and said inner hub, said spring member extending radially outwardly from said axle along the maximum distance from said axle to said inner hub, said spring member extending axially along said axle the major portion of the axial length of said inner hub making the front wheel hub assembly axially rigid;
said radially-outwardly-extending spring member connected to said inner hub member along its inner circumferential surface whereby said inner hub is angularly displaced relative to said axle responsive to varying load conditions on the front wheel;
a radially-inwardly-extending abutment stop means fastened to the inner circumferential surface of said inner hub; and
said abutment stop means innermost radial surface shaped to contact said leaf spring member along the major part of its diametrical extension, thereby limiting the angular displacement of said inner hub relative to said axle in the direction of impact loads on the support means.

9. In a suspension system for a wheel comprising:
an axle;
body support means;
an inner hub means disposed about said axle;
an outer hub means journalled to said inner hub means so that each of said hubs may rotate independently;
a plurality of arcuate mounting members connected to said inner hub means, said arcuate mounting members journalled to said axle;

spring means of generally-rectangular shape interconnecting said axle and said inner hub means, said spring means extending radially outwardly from said axle toward said inner hub means;

said spring means flexible in the plane perpendicular to said axle axis responsive to load conditions on said body support means;

a radially-inwardly-extending abutment stop means fastened to the inner circumferential surface of said inner hub; and said abutment stop means innermost radial surface shaped to contact said spring member along the major part of its diametrical extension, thereby limiting the angular displacement of said inner hub relative to said axle in the direction of impact loads on the support means.

References Cited by the Examiner
UNITED STATES PATENTS

| | | | |
|---|---|---|---|
| 672,172 | 4/1901 | Koehler | 280—286 |
| 684,997 | 10/1901 | Matheson | 280—286 |
| 759,638 | 5/1904 | Leger | 301—136 |
| 781,180 | 1/1905 | Brahant | 301—136 |
| 1,394,882 | 10/1921 | Beaumont | 201—136 |
| 2,012,860 | 8/1935 | Winkler | 280—286 |
| 3,157,242 | 11/1964 | Kozicki | 267—41 X |

KENNETH H. BETTS, *Primary Examiner.*